(12) United States Patent
Li

(10) Patent No.: US 11,888,696 B2
(45) Date of Patent: Jan. 30, 2024

(54) VNF INSTANTIATION METHOD AND APPARATUS

(71) Applicant: HUAWEI TECHNOLOGIES CO., LTD., Shenzhen (CN)

(72) Inventor: Shitao Li, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/946,665

(22) Filed: Sep. 16, 2022

(65) Prior Publication Data

US 2023/0024067 A1    Jan. 26, 2023

Related U.S. Application Data

(63) Continuation of application No. PCT/CN2021/078936, filed on Mar. 3, 2021.

(30) Foreign Application Priority Data

Mar. 18, 2020   (CN) .......................... 202010192596.5

(51) Int. Cl.
*H04L 41/0895*   (2022.01)
*H04L 41/122*    (2022.01)
*H04L 41/40*     (2022.01)

(52) U.S. Cl.
CPC ........ *H04L 41/0895* (2022.05); *H04L 41/122* (2022.05); *H04L 41/40* (2022.05)

(58) Field of Classification Search
CPC ... G06F 2009/4557; G06F 2009/45595; G06F 9/45558; H04L 41/0895; H04L 41/122;
(Continued)

(56) References Cited

U.S. PATENT DOCUMENTS

| 10,700,936 B2 * | 6/2020 | Senarath .............. H04L 41/40 |
| 11,194,609 B1 * | 12/2021 | Melkild .............. H04L 41/0886 |
| 2017/0111207 A1 | 4/2017 | Yoon |

FOREIGN PATENT DOCUMENTS

| CN | 104734931 A | 6/2015 |
| CN | 106685679 A | 5/2017 |

(Continued)

OTHER PUBLICATIONS

Miucci, Emanuele, et al. "Implementation of VNF Descriptor Extensions for the Lifecycle Management of VNFs." vol. 10: 107-116. (Year: 2017).*

(Continued)

*Primary Examiner* — John M Macilwinen
(74) *Attorney, Agent, or Firm* — HAUPTMAN HAM, LLP

(57) ABSTRACT

This application provides a VNF instantiation method and apparatus, applied to various NFV systems, to implement an existing VNFD model—defined VNF. The method includes: An NFVO obtains a VNFD, where the VNFD is for instantiating a VNF, the VNFD includes first indication information and resource requirement information of a first internal network, and the first indication information indicates that the resource requirement information of the first internal network is externally visible. Then, the NFVO sends an external network instantiation request to a VIM, where the external network instantiation request is used by the VIM to instantiate, based on the resource requirement information of the first internal network, an external network connected to the VNF. Then, the NFVO sends a VNF instantiation request to a VNFM. The VNF instantiation request is used by the VNFM to instantiate the VNF based on the VNFD.

20 Claims, 5 Drawing Sheets

(58) Field of Classification Search
CPC .. H04L 41/40; H04L 12/4633; H04L 12/4641
See application file for complete search history.

(56) References Cited

FOREIGN PATENT DOCUMENTS

| | | | | |
|---|---|---|---|---|
| CN | 106856438 A | 6/2017 | | |
| CN | 107332750 A | 11/2017 | | |
| EP | 3203686 A1 * | 8/2017 | ............. | H04L 12/66 |
| EP | 3252603 A1 | 12/2017 | | |
| EP | 3471342 A1 | 4/2019 | | |
| WO | WO-2016037479 A1 * | 3/2016 | ............. | H04L 12/46 |
| WO | 2016070609 A1 | 5/2016 | | |
| WO | WO-2016107506 A1 * | 7/2016 | ............. | H04L 29/08 |
| WO | WO-2016165292 A1 * | 10/2016 | | |
| WO | WO-2018040797 A1 * | 3/2018 | | |
| WO | WO-2018152386 A1 * | 8/2018 | ......... | G07F 9/45558 |
| WO | WO-2019233124 A1 * | 12/2019 | ......... | G06F 9/45533 |

OTHER PUBLICATIONS

Extended European Search Report issued in corresponding European Application No. 21771016.9, dated Jul. 7, 2023, pp. 1-8.
International Search Report issued in corresponding International Application No. PCT/CN2021/078936, dated Jun. 9, 2021, pp. 1-10.

* cited by examiner

VNF INSTANTIATION METHOD AND APPARATUS

CROSS-REFERENCE TO RELATED APPLICATIONS

This application is a continuation of International Application No. PCT/CN2021/078936, filed on Mar. 3, 2021. The International Application claims priority to Chinese Application No. 202010192596.5, filed on Mar. 18, 2020. The afore-mentioned patent applications are hereby incorporated by reference in their entirety.

TECHNICAL FIELD

This application relates to the communication field, and in particular, to a VNF instantiation method and apparatus.

BACKGROUND

Network functions virtualization (network functions virtualization, NFV) implements functions of dedicated devices in a conventional network using general-purpose hardware devices and virtualization technologies, and may implement quick deployment of new network services (network services, NSs) through resource sharing, to reduce network deployment costs and improve network running efficiency. One NS may be implemented using a plurality of virtualised network functions (virtualised network functions, VNFs). A VNF may include modules such as a virtual deployment unit (virtualisation deployment unit, VDU), a connection point (connection point, CP), and a virtual link (virtual link, VL), which may be defined in VNF description information (VNF descriptor, VNFD).

For example, FIG. 1 is a schematic diagram of a structure of an existing VNFD model—defined VNF. As shown in FIG. 1, the VNF includes: two internal networks Int-VL1 and Int-VL2, two virtual deployment units VDU-A and VDU-B, three internal connection points VduCp-a2, VduCp-b1, and VduCp-b2, and one external connection point ExtCp. The ExtCp is for establishing a connection between an external network Ext-VL and the internal network Int-VL1, in other words, the ExtCp is a relay node (relay node) between the external network Ext-VL and the internal network Int-VL1. Specifically, the ExtCp, as a port (port) in the internal network Int-VL1, is connected to the external network Ext-VL; or the ExtCp, as a port in the internal network Int-VL1, is connected to a port in the external network Ext-VL.

However, in current network implementation, the ExtCp is a port incapable of forwarding, and cannot serve as a relay node between an external network Ext-VL and an internal network Int-VL1. In other words, the VNFD model—defined VNF shown in FIG. 1 cannot be implemented currently.

SUMMARY

Embodiments of this application provide a VNF instantiation method and apparatus, to implement a VNFD model—defined VNF shown in FIG. 1.

To achieve the foregoing objective, this application uses the following technical solutions.

According to a first aspect, a VNF instantiation method is provided. The method includes: A network functions virtualisation orchestrator NFVO receives virtualised network function description information VNFD from an operations support system/business support system OSS/BSS, where the VNFD is for instantiating a virtualised network function VNF, the VNFD includes first indication information and resource requirement information of a first internal network, and the first indication information indicates that the resource requirement information of the first internal network is externally visible. Then, the NFVO sends an external network instantiation request to a virtualized infrastructure manager VIM, where the external network instantiation request is used by the VIM to instantiate, based on the resource requirement information of the first internal network, an external network connected to the VNF. Then, the NFVO sends a VNF instantiation request to a virtualized network function manager VNFM. The VNF instantiation request is used by the VNFM to instantiate the VNF based on the VNFD.

Based on the VNF instantiation method in the first aspect, the NFVO can obtain the first indication information in the VNFD. The first indication information indicates that the resource requirement information of the first internal network in the VNFD is externally visible. In other words, the external network may be instantiated based on the resource requirement information of the first internal network. In this way, the NFVO may request, based on the resource requirement information of the first internal network, the VIM to instantiate the external network, and request, based on the VNFD, the VNFM to instantiate the VNF, to establish direct communication between the VNF and the external network. This can resolve a problem that a communication connection between an internal network and an external network cannot be established because the NFVO cannot be connected to both the internal network and the external network at the same time via a same external connection point in the VNF, and there is no need to instantiate the external connection point and an entity corresponding to the internal network in the VNF. This can improve VNF instantiation efficiency.

Optionally, the first indication information further indicates that the VNFM does not need to instantiate the first internal network during instantiation of the VNF. In other words, the first internal network may also be instantiated when the NFVO requests the VIM to instantiate the external network based on the resource requirement information of the first internal network.

Optionally, the first indication information may be defined in a capabilities field of the first internal network in the VNFD.

In a possible design solution, that the resource requirement information of the first internal network is externally visible may include: The external network obtains the resource requirement information of the first internal network based on information about an external connection point in the VNFD. In other words, the resource requirement information of the first internal network may be provided by the external connection point in the VNFD for the external network.

Optionally, that the external network obtains the resource requirement information of the first internal network based on information about an external connection point in the VNFD may include: The VNFD may further include second indication information, where the second indication information indicates that the external connection point in the VNF is a virtual node, and the external connection point is used to set the resource requirement information of the first internal network to be externally visible.

The virtual node may be understood as that there is no need to instantiate the external connection point in the VNF. The external connection point is only used to provide the resource requirement information of the first internal network for the external network, and is not used to establish a communication connection between the internal network and the external network.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD. In other words, the resource requirement information of the first internal network may be provided by the first internal network for the external network. In other words, alternatively, the external connection point may not be defined in a VNFD model, but the resource requirement information of the first internal network is directly set to be externally visible, to further simplify a VNF instantiation operation procedure. This improves the VNF instantiation efficiency.

Optionally, that the external network obtains the resource requirement information of the first internal network based on internal network information in the VNFD may include: The VNFD may further include third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of first ports is the same as a quantity of VDUCPs connected to the internal network. This can avoid a mismatch problem caused by inconsistency between a port quantity of the external network and a port quantity of the internal network.

In a possible design solution, that a network functions virtualisation orchestrator NFVO receives virtualised network function description information VNFD from an operations support system/business support system OSS/BSS may include: The NFVO receives a VNF package file from the OSS/BSS. The VNF package file is for obtaining the VNFD.

It should be noted that a same VNFD may correspond to one or more VNF package files, and the one or more VNF package files may be carried by one or more messages. The NFVO may parse the one or more messages received from the OSS/BSS, to obtain the one or more VNF package files carried by the one or more messages.

Further, the NFVO may further send one or more response messages for the one or more messages to the OSS/BSS, to notify the OSS/BSS of whether the VNF package file is successfully received. If receiving fails, the response message may be used to request the OSS/BSS to resend a VNF package file that fails to be received last time, to improve reliability of VNF package file transmission.

Alternatively, optionally, the NFVO may read a VNF package file from a local cache of the NFVO. This is not specifically limited in this embodiment of this application.

In a possible design solution, the VNF instantiation method according to the first aspect may further include: The NFVO receives network service description information (network service descriptor, NSD) from the OSS/BSS. The NSD includes an identifier of the VNFD and fourth indication information. The fourth indication information indicates that external connection information of the VNF is the resource requirement information of the first internal network, and there is no need to define a resource requirement of the external network in the NSD. In other words, the resource requirement of the external network may be determined based on the resource requirement information of the first internal network, to instantiate the external network. This reduces a data volume of an NSD that needs to be transmitted. This further improves the VNF instantiation efficiency.

Optionally, the fourth indication information may be defined in a requirements field of the VNF and a capabilities field of the external network in the NSD.

Alternatively, optionally, the fourth indication information may be defined in a capabilities field of the VNF and a requirements field of the external network in the NSD.

According to a second aspect, a VNF instantiation method is provided. The method includes: An operations support system/business support system OSS/BSS sends virtualised network function description information VNFD to a network functions virtualisation orchestrator NFVO. The VNFD is for instantiating a virtualised network function VNF. The VNFD includes first indication information and resource requirement information of a first internal network. The first indication information indicates that the resource requirement information of the first internal network is externally visible. Then, the OSS/BSS sends network service description information NSD to the NFVO. The NSD includes an identifier of the VNFD and fourth indication information. The fourth indication information indicates that external connection information of the VNF is the resource requirement information of the first internal network, and there is no need to define a resource requirement of an external network in the NSD.

Optionally, the first indication information further indicates that the VNFM does not need to instantiate the first internal network during instantiation of the VNF. In other words, the first internal network may also be instantiated when the NFVO requests the VIM to instantiate the external network based on the resource requirement information of the first internal network.

Optionally, the first indication information may be defined in a capabilities field of an internal network in the VNFD.

In a possible design solution, that the resource requirement information of the first internal network is externally visible may include: The external network obtains the resource requirement information of the first internal network based on information about an external connection point in the VNFD.

Optionally, that the external network obtains the resource requirement information of the first internal network based on information about an external connection point in the VNFD may include: The VNFD further includes second indication information, where the second indication information indicates that the external connection point in the VNF is a virtual node, and the external connection point is used to set the resource requirement information of the first internal network to be externally visible.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD.

Optionally, that the external network obtains the resource requirement information of the first internal network based on internal network information in the VNFD may include: The VNFD may further include third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of first ports is the same as a quantity of VDUCPs connected to the internal network.

Optionally, the fourth indication information may be defined in a requirements field of the VNF and a capabilities field of the external network in the NSD.

Alternatively, optionally, the fourth indication information may be defined in a capabilities field of the VNF and a requirements field of the external network in the NSD.

In a possible design solution, that an operations support system/business support system OSS/BSS sends virtualised network function description information VNFD to a network functions virtualisation orchestrator NFVO may include: The OSS/BSS sends a VNF package file to the NFVO. The VNF package file is for obtaining the VNFD.

It should be noted that a same VNFD may correspond to one or more VNF package files. This is not specifically limited in this embodiment of this application.

Optionally, the OSS/BSS may send the VNF package file to the NFVO by using one or more messages.

Further, the OSS/BSS may receive one or more response messages for the one or more messages, to learn of whether the NFVO successfully receives the VNF package file. If the NFVO fails to receive the VNF package file, the OSS/BSS may resend a VNF package file that fails to be received last time to the NFVO, to improve reliability of VNF package file transmission.

In addition, for a technical effect of the VNF instantiation method in the second aspect, refer to the technical effect of the VNF instantiation method in the first aspect. Details are not described herein again.

According to a third aspect, a VNF instantiation method is provided. The method includes: A virtualized infrastructure manager VIM receives an external network instantiation request from a network functions virtualisation orchestrator NFVO. The external network instantiation request includes resource requirement information of a first internal network. The resource requirement information of the first internal network is used by the VIM to instantiate an external network connected to a virtualised network function VNF.

In a possible design solution, the VNF instantiation method according to the third aspect may further include: The VIM receives a port instantiation request from a virtualized network function manager VNFM. The port instantiation request is used by the VIM to instantiate a first port in the external network. The first port is used by the external network to communicate with the first internal network by using a VDUCP.

In addition, for a technical effect of the VNF instantiation method in the third aspect, refer to the technical effect of the VNF instantiation method in the first aspect. Details are not described herein again.

According to a fourth aspect, a VNF instantiation method is provided. The method includes: A virtualized network function manager VNFM receives a virtualised network function VNF instantiation request from a network functions virtualisation orchestrator NFVO. The VNF instantiation request includes an instance identifier of a VNF. The instance identifier is for obtaining virtualised network function description information VNFD. The VNFD is used by the VNFM to instantiate the VNF. The VNFD includes first indication information and resource requirement information of a first internal network. The first indication information indicates that the resource requirement information of the first internal network is externally visible.

Optionally, the first indication information further indicates that the VNFM does not need to instantiate the first internal network during instantiation of the VNF. In other words, the first internal network may also be instantiated when the NFVO requests a VIM to instantiate an external network based on the resource requirement information of the first internal network.

Optionally, the first indication information may be defined in a capabilities field of an internal network in the VNFD.

In a possible design solution, that the resource requirement information of the first internal network is externally visible may include: The external network obtains the resource requirement information of the first internal network based on information about an external connection point in the VNFD. In other words, the resource requirement information of the first internal network may be provided by the external connection point in the VNFD for the external network.

Optionally, that the external network obtains the resource requirement information of the first internal network based on information about an external connection point in the VNFD may include: The VNFD may further include second indication information, where the second indication information indicates that the external connection point in the VNF is a virtual node, and the external connection point is used to set the resource requirement information of the first internal network to be externally visible.

The virtual node may be understood as that there is no need to instantiate the external connection point in the VNF. The external connection point is only used to provide the resource requirement information of the first internal network for the external network, and is not used to establish a communication connection between the internal network and the external network.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD. In other words, the resource requirement information of the first internal network may be provided by the first internal network for the external network.

Optionally, that the external network obtains the resource requirement information of the first internal network based on internal network information in the VNFD may include: The VNFD further includes third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of first ports is the same as a quantity of VDUCPs connected to the internal network.

In addition, for a technical effect of the VNF instantiation method in the fourth aspect, refer to the technical effect of the VNF instantiation method in the first aspect. Details are not described herein again.

According to a fifth aspect, a VNF instantiation apparatus is provided. The apparatus includes a transceiver module. The transceiver module is configured to receive virtualised network function description information VNFD from an operations support system/business support system OSS/BSS. The VNFD is for instantiating a virtualised network function VNF. The VNFD includes first indication information and resource requirement information of a first internal network. The first indication information indicates that the resource requirement information of the first internal network is externally visible. The transceiver module is further configured to send an external network instantiation request to a virtualized infrastructure manager VIM. The external network instantiation request is used by the VIM to instantiate, based on the resource requirement information of the first internal network, an external network connected to the VNF. The transceiver module is further configured to send a VNF instantiation request to a virtualized network function manager VNFM, where the VNF instantiation request is used by the VNFM to instantiate the VNF based on the VNFD.

Optionally, the first indication information further indicates that the VNFM does not need to instantiate the first internal network during instantiation of the VNF. In other words, the first internal network may also be instantiated when an NFVO requests the VIM to instantiate the external network based on the resource requirement information of the first internal network.

Optionally, the first indication information may be defined in a capabilities field of an internal network in the VNFD.

In a possible design solution, that the resource requirement information of the first internal network is externally visible may include: The external network obtains the resource requirement information of the first internal network based on information about an external connection point in the VNFD. In other words, the resource requirement information of the first internal network may be provided by the external connection point in the VNFD for the external network.

Optionally, that the external network obtains the resource requirement information of the first internal network based on information about an external connection point in the VNFD may include: The VNFD may further include second indication information, where the second indication information indicates that the external connection point in the VNF is a virtual node, and the external connection point is used to set the resource requirement information of the first internal network to be externally visible.

The virtual node may be understood as that there is no need to instantiate the external connection point in the VNF. The external connection point is only used to provide the resource requirement information of the first internal network for the external network, and is not used to establish a communication connection between the internal network and the external network.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD. In other words, the resource requirement information of the first internal network may be provided by the first internal network for the external network.

Optionally, that the external network obtains the resource requirement information of the first internal network based on internal network information in the VNFD may include: The VNFD may further include third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of first ports is the same as a quantity of VDUCPs connected to the internal network.

In a possible design solution, the transceiver module is further configured to receive a VNF package file from the OSS/BSS, where the VNF package file is for obtaining the VNFD.

Optionally, the VNF instantiation apparatus according to the fifth aspect may alternatively read a VNF package file from a local cache of the VNF instantiation apparatus. This is not specifically limited in this embodiment of this application.

In a possible design solution, the transceiver module is further configured to receive network service description information NSD from the OSS/BSS. The NSD includes an identifier of the VNFD and fourth indication information. The fourth indication information indicates that external connection information of the VNF is the resource requirement information of the first internal network, and there is no need to define a resource requirement of the external network in the NSD.

Optionally, the fourth indication information may be defined in a requirements field of the VNF and a capabilities field of the external network in the NSD. Alternatively, optionally, the fourth indication information may be defined in a capabilities field of the VNF and a requirements field of the external network in the NSD. This is not specifically limited in this embodiment of this application.

Optionally, the VNF instantiation apparatus according to the fifth aspect may further include a processing module and a storage module. The storage module stores a program or instructions. When the processing module executes the program or the instructions, the VNF instantiation apparatus according to the fifth aspect is enabled to perform the VNF instantiation method according to the first aspect.

It should be noted that the VNF instantiation apparatus in the fifth aspect may be an NFVO, or a chip (system) or another part or component that can be disposed in the NFVO. This is not limited in this application.

In addition, for a technical effect of the VNF instantiation apparatus in the fifth aspect, refer to the technical effect of the VNF instantiation method in the first aspect. Details are not described herein again.

According to a sixth aspect, a VNF instantiation apparatus is provided. The apparatus includes a transceiver module. The transceiver module is configured to send virtualised network function description information VNFD to a network functions virtualisation orchestrator NFVO. The VNFD is for instantiating a virtualised network function VNF. The VNFD includes first indication information and resource requirement information of a first internal network. The first indication information indicates that the resource requirement information of the first internal network is externally visible. The transceiver module is further configured to send network service description information NSD to the NFVO. The NSD includes an identifier of the VNFD and fourth indication information. The fourth indication information indicates that external connection information of the VNF is the resource requirement information of the first internal network, and there is no need to define a resource requirement of an external network in the NSD.

Optionally, the first indication information further indicates that a VNFM does not need to instantiate the first internal network during instantiation of the VNF. In other words, the first internal network may also be instantiated when the NFVO requests a VIM to instantiate the external network based on the resource requirement information of the first internal network.

Optionally, the first indication information may be defined in a capabilities field of an internal network in the VNFD.

In a possible design solution, that the resource requirement information of the first internal network is externally visible may include: The external network obtains the resource requirement information of the first internal network based on information about an external connection point in the VNFD.

Optionally, that the external network obtains the resource requirement information of the first internal network based on information about an external connection point in the VNFD may include: The VNFD further includes second indication information, where the second indication information indicates that the external connection point in the VNF is a virtual node, and the external connection point is used to set the resource requirement information of the first internal network to be externally visible.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD.

Optionally, that the external network obtains the resource requirement information of the first internal network based on internal network information in the VNFD may include: The VNFD may further include third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of the first ports is the same as a quantity of VDUCPs connected to the internal network.

Optionally, the fourth indication information may be defined in a requirements field of the VNF and a capabilities field of the external network in the NSD.

Alternatively, optionally, the fourth indication information may be defined in a capabilities field of the VNF and a requirements field of the external network in the NSD.

In a possible design solution, the transceiver module is further configured to send a VNF package file to the NFVO. The VNF package file is for obtaining the VNFD.

It should be noted that a same VNFD may correspond to one or more VNF package files, and the one or more VNF package files may be carried by one or more messages.

Further, the transceiver module is further configured to receive one or more response messages for the one or more messages from the NFVO, to learn of whether the NFVO successfully receives the VNF package file. If the NFVO fails to receive the VNF package file, the transceiver module is further configured to resend a VNF package file that fails to be received last time to the NFVO, to improve reliability of VNF package file transmission.

Optionally, the VNF instantiation apparatus according to the sixth aspect may further include a processing module and a storage module. The storage module stores a program or instructions. When the processing module executes the program or the instructions, the VNF instantiation apparatus according to the sixth aspect is enabled to perform the VNF instantiation method according to the second aspect.

It should be noted that the VNF instantiation apparatus in the sixth aspect may be a BSS/OSS, or a chip (system) or another part or component that can be disposed in the BSS/OSS. This is not limited in this application.

In addition, for a technical effect of the VNF instantiation apparatus in the sixth aspect, refer to the technical effect of the VNF instantiation method in the first aspect. Details are not described herein again.

According to a seventh aspect, a VNF instantiation apparatus is provided. The apparatus includes a transceiver module. The transceiver module is configured to receive an external network instantiation request from a network functions virtualisation orchestrator NFVO. The external network instantiation request includes resource requirement information of a first internal network. The resource requirement information of the first internal network is used by a VIM to instantiate an external network connected to a virtualised network function VNF. The transceiver module is further configured to send instance information of the external network to the NFVO. The instance information of the external network is determined based on the resource requirement information of the first internal network.

In a possible design solution, the transceiver module is further configured to receive a port instantiation request from a virtualized network function manager VNFM. The port instantiation request is used by the VIM to instantiate a first port in the external network. The first port is used by the external network to communicate with an internal network by using a VDUCP.

Optionally, the VNF instantiation apparatus according to the seventh aspect may further include a processing module and a storage module. The storage module stores a program or instructions. When the processing module executes the program or the instructions, the VNF instantiation apparatus according to the seventh aspect is enabled to perform the VNF instantiation method according to the third aspect.

It should be noted that the VNF instantiation apparatus in the seventh aspect may be a VIM, or a chip (system) or another part or component that can be disposed in the VIM. This is not limited in this application.

In addition, for a technical effect of the VNF instantiation apparatus in the seventh aspect, refer to the technical effect of the VNF instantiation method in the first aspect. Details are not described herein again.

According to an eighth aspect, a VNF instantiation apparatus is provided. The apparatus includes a transceiver module. The transceiver module is configured to receive a virtualised network function VNF instantiation request from a network functions virtualisation orchestrator NFVO. The VNF instantiation request includes virtualised network function description information VNFD. The VNFD is used by a VNFM to instantiate a VNF. The VNFD includes first indication information and resource requirement information of a first internal network. The first indication information indicates that the resource requirement information of the first internal network is externally visible.

Optionally, the first indication information further indicates that the VNFM does not need to instantiate the first internal network during instantiation of the VNF. In other words, the first internal network may also be instantiated when the NFVO requests a VIM to instantiate an external network based on the resource requirement information of the first internal network.

Optionally, the first indication information may be defined in a capabilities field of an internal network in the VNFD.

In a possible design solution, that the resource requirement information of the first internal network is externally visible may include: The external network obtains the resource requirement information of the first internal network based on information about an external connection point in the VNFD. In other words, the resource requirement information of the first internal network may be provided by the external connection point in the VNFD for the external network.

Optionally, that the external network obtains the resource requirement information of the first internal network based on information about an external connection point in the VNFD may include: The VNFD may further include second indication information, where the second indication information indicates that the external connection point in the VNF is a virtual node, and the external connection point is used to set the resource requirement information of the first internal network to be externally visible. The virtual node may be understood as that there is no need to instantiate the external connection point in the VNF. The external connection point is only used to provide the resource requirement information of the first internal network for the external network, and is not used to establish a communication connection between the internal network and the external network.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD. In other words, the resource requirement information of the first internal network may be provided by the first internal network for the external network.

Optionally, that the external network obtains the resource requirement information of the first internal network based on internal network information in the VNFD may include: The VNFD further includes third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of first ports is the same as a quantity of VDUCPs connected to the internal network.

Optionally, the VNF instantiation apparatus according to the eighth aspect may further include a processing module and a storage module. The storage module stores a program or instructions. When the processing module executes the program or the instructions, the VNF instantiation apparatus according to the eighth aspect is enabled to perform the VNF instantiation method according to the fourth aspect.

It should be noted that the VNF instantiation apparatus in the eighth aspect may be a VNFM, or a chip (system) or another part or component that can be disposed in the VNFM. This is not limited in this application.

In addition, for a technical effect of the VNF instantiation apparatus in the eighth aspect, refer to the technical effect of the VNF instantiation method in the first aspect. Details are not described herein again.

According to a ninth aspect, a VNF instantiation apparatus is provided. The VNF instantiation apparatus includes a processor. The processor is coupled to a memory. The memory is configured to store a computer program. The processor is configured to execute the computer program stored in the memory, to enable the VNF instantiation apparatus to perform the VNF instantiation method according to any one of the possible implementations of the first aspect to the fourth aspect.

In a possible design, the VNF instantiation apparatus according to the ninth aspect may further include a transceiver. The transceiver may be a transceiver circuit or an input/output port. The transceiver may be used by the VNF instantiation apparatus to communicate with another VNF instantiation apparatus.

In this application, the VNF instantiation apparatus in the ninth aspect may be an NFVO, a BSS/OSS, a VIM, or a VNFM, or a chip (system) or another part or component that can be disposed in the NFVO, the BSS/OSS, the VIM, or the VNFM.

For a technical effect of the VNF instantiation apparatus in the ninth aspect, refer to the technical effect of the VNF instantiation method in any implementation of the first aspect. Details are not described herein again.

According to a tenth aspect, a chip system is provided. The chip system includes a processor and an input/output port. The processor is configured to implement a processing function in the first aspect to the fourth aspect. The input/output port is configured to implement a transceiver function in the first aspect to the fourth aspect.

In a possible design, the chip system further includes a memory. The memory is configured to store program instructions and data for implementing the functions in the first aspect or the second aspect.

The chip system may include a chip, or may include a chip and another discrete component.

According to an eleventh aspect, an NFV system is provided. The NFV system includes an NFVO, a BSS/OSS, a VIM, a VNFM, an NFVI, one or more VNFs, and one or more EMs.

According to a twelfth aspect, a computer-readable storage medium is provided. The computer-readable storage medium includes a computer program or instructions. When the computer program or the instructions is/are run on a computer, the computer is enabled to perform the VNF instantiation method according to any one of the possible implementations of the first aspect to the fourth aspect.

According to a thirteenth aspect, a computer program product is provided. The computer program product includes a computer program or instructions. When the computer program or the instructions is/are run on a computer, the computer is enabled to perform the VNF instantiation method according to any one of the possible implementations of the first aspect to the fourth aspect.

DESCRIPTION OF EMBODIMENTS

The following describes technical solutions of this application with reference to accompanying drawings.

The technical solutions in embodiments of this application may be applied to various NFV systems, for example, various NFV systems that comply with an NFV standard formulated by the European Telecommunications Standards Institute (European telecommunications standards institute, ETSI).

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

Network architectures and service scenarios described in embodiments of this application are intended to describe the technical solutions in embodiments of this application more clearly, and do not constitute any limitation on the technical solutions provided in embodiments of this application. A person of ordinary skill in the art should understand that, with evolution of the network architectures and emergence of new service scenarios, the technical solutions provided in embodiments of this application are also applicable to similar technical problems.

Figure 2:
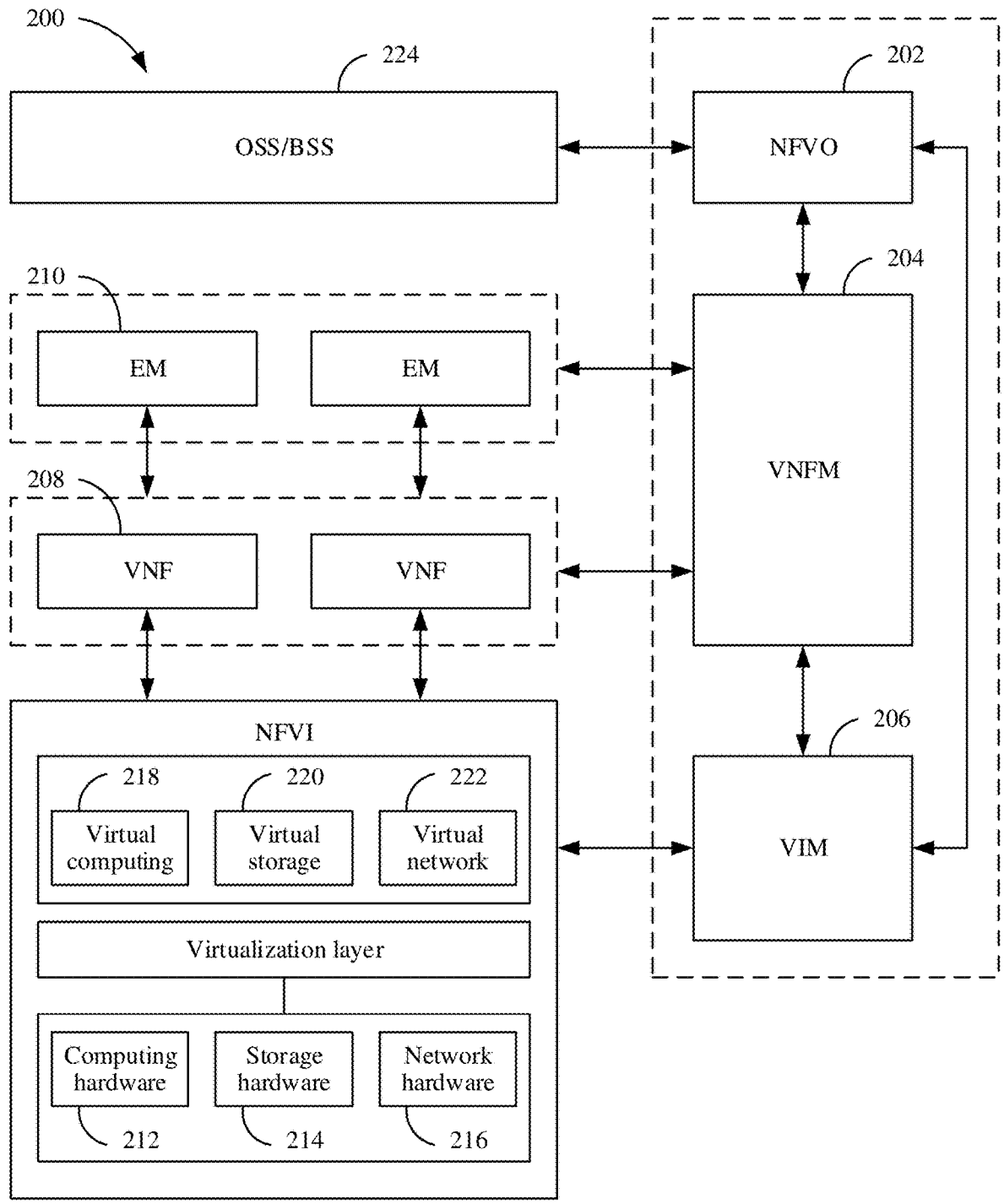
FIG. 2 is a schematic diagram of an architecture of an NFV system according to an embodiment of this application.

FIG. 2 is a schematic diagram of an architecture of an NFV system to which a VNF instantiation method is applicable according to an embodiment of this application. As shown in FIG. 2, the NFV system 200 includes a network functions virtualisation orchestrator (NFV orchestrator, NFVO) 202, one or more virtualized network function managers (virtualized network function managers, VNFMs) 204, a virtualized infrastructure manager (virtualized infrastructure manager, VIM) 206, a network functions virtualization infrastructure (network functions virtualization infrastructure, NFVI), an operations support system and business support system (operations support system and business support system, OSS/BSS) 224, one or more equipment management systems (equipment manager, EM) 210, and one or more VNFs 208.

The NFVO 202 is mainly responsible for processing life cycle management of virtualization services, allocation and scheduling of virtual resources in the VIM 206 and the NFVI, and the like. The NFVO 202 may communicate with the one or more VNFMs 204, to execute a related request of the VNF 208, send configuration information to the VNFM 204, and collect status information of the VNF 208. In addition, the NFVO 202 may also communicate with the VIM 206, perform resource allocation and/or reservation, and exchange virtualized hardware resource configuration and status information.

The VNFM 204 is responsible for life cycle management of the one or more VNFs 208, for example, instantiating (instantiating), updating (updating), querying, auto scaling (scaling), or terminating (terminating) of the VNF 208. Specifically, the VNFM 204 may communicate with the VNF 208, to complete life cycle management of the VNF 208 and exchange configuration information and status information. It should be understood that there may be a plurality of VNFMs in a same NFV system, and the VNFMs are respectively responsible for life cycle management of different types of VNFs.

The VIM 206 is responsible for controlling and managing interaction between the VNF 208 and each of computing hardware 212, storage hardware 214, network hardware 216, virtual computing (virtual computing) 218, virtual storage 220, and a virtual network 222. For example, the VIM 206 may perform a resource management function, including infrastructure resource management, allocation (for example, adding a resource to a virtual container), and a running function (for example, collecting fault information of the NFVI). The VNFM 204 and the VIM 206 may communicate with each other, to request resource allocation and exchange configuration information and status information of a virtualized hardware resource.

The NFVI, an infrastructure layer of the NFV, includes a hardware component, a software component, or a combination thereof, to establish a virtualization environment, and deploy, manage, and implement the VNF 208. A hardware resource and a virtualization layer are used to provide virtualized resources, such as a virtual machine and a virtual container in another form, for the VNF 208. The hardware resource includes the computing (computing) hardware 212, the storage hardware 214, and the network hardware 216. In an implementation, resources of the computing hardware 212 and the storage hardware 214 may be deployed together. The virtualization layer in the NFVI is configured to abstract the hardware resource as a virtual resource, to decouple the VNF 208 from an underlying physical network layer.

The EM 210 is a system that is in a conventional telecommunications system and that is configured to manage and configure a device. In the NFV system 200, the EM 210 may also be configured to: configure and manage the VNF 208, and initiate a life cycle management operation, for example, instantiation of a new VNF, to the VNFM 204.

The OSS/BSS 224 is configured to support various telecommunications services. Management functions supported by the OSS include network configuration, service provisioning, fault management, and the like. The BSS processes an order, payment, income, or the like, and supports product management, order management, profit management, and customer management.

In the NFV system 200, a party that can receive a virtualization request and perform virtualization processing on a corresponding network service based on the virtualization request is referred to as a virtualization service provider, and a party that initiates the virtualization request is referred to as a virtualization service requester. The virtualization service may be an internet protocol multimedia subsystem (internet protocol multimedia subsystem, IMS) network service, a next-generation mobile core network service (evolved packet core, EPC) service, or the like. This is not limited in this embodiment of this application.

The virtualization request may include network service description information (network service descriptor, NSD, also referred to as an NS deployment template) corresponding to the requested virtualization service. The NSD is used to describe a topology structure of the network service and a VNFD of each included VNF. Virtual link description information (virtual link descriptor, VLD) is used in topology (topology) structure information to describe a connection between VNFs.

Figure 1:
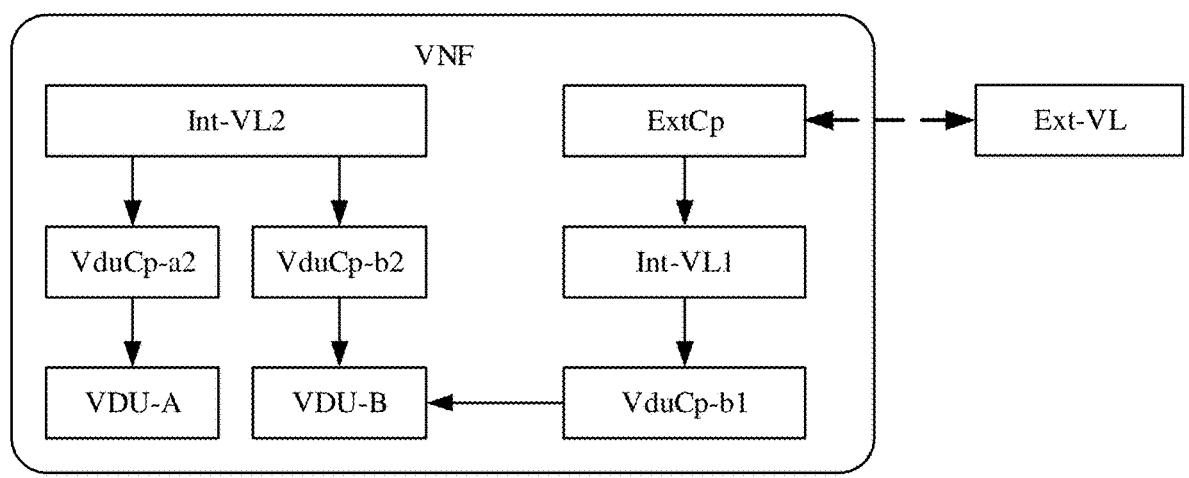
FIG. 1 is a schematic diagram of a structure of an existing VNFD model—defined VNF.

The VNFD may include the following information: description information of one or more VDUs, description information of one or more internal and/or external connection points CPs (connection points), description information of one or more virtual links VLs (virtual links), and the like. The VDU may be considered as a virtual machine on which application software is installed. A description of the VDU includes requirement descriptions of all virtual resources of the virtual machine. The CP represents connection information of the virtual machine, for example, virtual network interface card (virtual network interface card, vNIC) information, and may be represented by an internet protocol (internet protocol, IP) address or a media access control (media access control, MAC) address. The VL is a virtual link, in the VNF, that connects a plurality of VDUs, and may be represented by information such as a connectivity type and bandwidth. The NFVO 202 may request, based on the VNFD, the VNFM 204 to instantiate the VNF, for example, the VNF shown in FIG. 1.

In embodiments of this application, "instantiate (instantiate)" and "establish (establish)" have a same meaning, and both are establishing a network entity. For example, instantiating a VNF is establishing a VNF entity. For another example, creating an external network is establishing an external network entity.

Currently, a VNFD may be defined using a topology and orchestration specification for cloud applications (topology and orchestration specification for cloud applications, TOSCA) language formulated by the organization for the advancement of structured information standards (organization for the advancement of structured information standards, OASIS). For details, refer to the conventional technology. Details are not described again in this embodiment of this application.

It should be noted that the VNF instantiation method provided in this embodiment of this application is applicable to communication between the OSS/BSS 224 and the NFVO 202, between the NFVO 202 and the VNFM 204, and between the NFVO 202 and the VIM 206 in the NFV system shown in FIG. 2.

It should be understood that FIG. 2 is merely a simplified schematic diagram of an example for ease of understanding. The NFV system 200 may further include another device that is not shown in FIG. 2.

Figure 3:
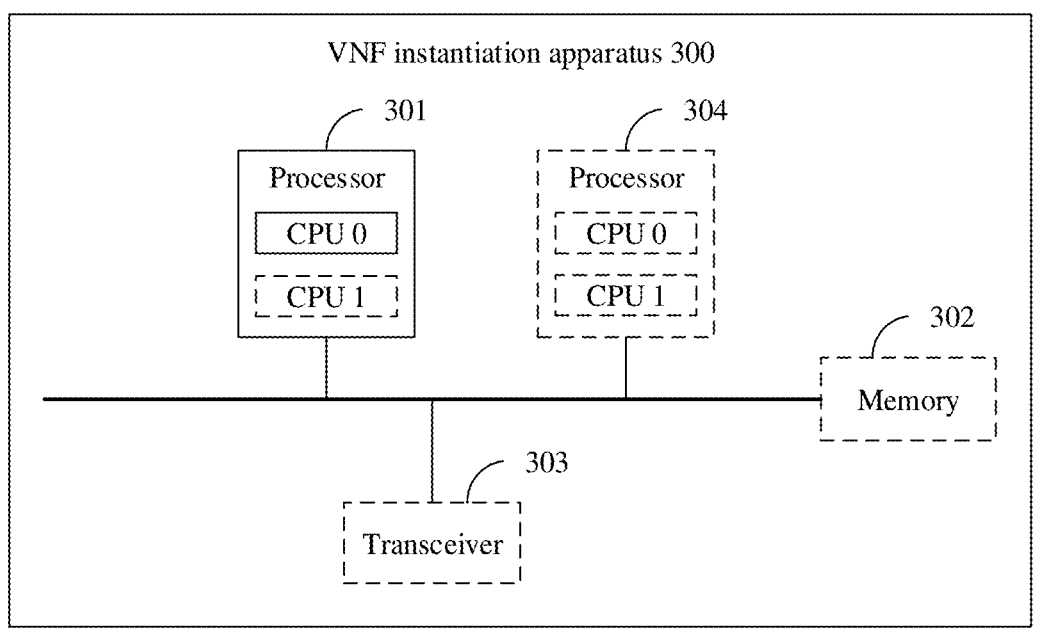
FIG. 3 is a schematic diagram 1 of a structure of a VNF instantiation apparatus according to an embodiment of this application.

For example, FIG. 3 is a schematic diagram 1 of a structure of a VNF instantiation apparatus that may be configured to perform a VNF instantiation method according to an embodiment of this application. The VNF instantiation apparatus may be an NFVO, an OSS/BSS, a VNFM, or a VIM, or a chip (system) or another part or component that can be disposed in the NFVO, the OSS/BSS, the VNFM, or the VIM.

As shown in FIG. 3, a VNF instantiation apparatus 300 may include a processor 301. Optionally, the VNF instantiation apparatus 300 may further include a memory 302 and/or a transceiver 303. The processor 301 is coupled to the memory 302 and the transceiver 303. For example, the processor 301 may be connected to the memory 302 and the transceiver 303 through a communication bus.

The following describes each component of the VNF instantiation apparatus 300 in detail with reference to FIG. 3.

The processor 301 is a control center of the VNF instantiation apparatus 300, and may be one processor, or may be a collective term of a plurality of processing elements. For example, the processor 301 may be one or more central processing units (central processing units, CPUs), or an application-specific integrated circuit (application-specific integrated circuit, ASIC), or may be configured as one or more integrated circuits implementing embodiments of this application, for example, one or more microprocessors (digital signal processors, DSPs) or one or more field programmable gate arrays (field programmable gate arrays, FPGAs).

The processor 301 may perform various functions of the VNF instantiation apparatus 300 by running or executing a software program stored in the memory 302 and invoking data stored in the memory 302.

During specific implementation, in an embodiment, the processor 301 may include one or more CPUs, for example, a CPU 0 and a CPU 1 shown in FIG. 3.

During specific implementation, in an embodiment, the VNF instantiation apparatus 300 may alternatively include a plurality of processors, for example, the processor 301 and a processor 304 shown in FIG. 3. Each of the processors may be a single-core processor (single-CPU) or may be a multi-core processor (multi-CPU). The processor herein may be one or more communication devices, circuits, and/or processing cores configured to process data (for example, computer program instructions).

The memory 302 may be a read-only memory (read-only memory, ROM) or another type of static storage communication device that can store static information and instructions, or a random access memory (random access memory, RAM) or another type of dynamic storage communication device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be used for carrying or storing expected program code in a form of an instruction or a data structure and that can be accessed by a computer. However, the memory 302 is not limited thereto. The memory 302 may be integrated with the processor 301, or may exist independently, and is coupled to the processor 301 through an input/output port (not shown in FIG. 3) of the VNF instantiation apparatus 300. This is not specifically limited in this embodiment of this application.

The memory 302 is configured to store a software program for performing the solutions of this application, and the processor 301 controls execution of the software program. For a specific implementation, refer to the following method embodiments. Details are not described herein.

The transceiver 303 is configured to communicate with another VNF instantiation apparatus. For example, the VNF instantiation apparatus 300 may be an NFVO, and the transceiver 303 may be used by the NFVO to communicate with an OSS/BSS, a VNFM, and a VIM. For another example, the VNF instantiation apparatus 300 may be an OSS/BSS, and the transceiver 303 may be used by the OSS/BSS to communicate with an NFVO.

It should be understood that the transceiver 303 may include a receiver and a transmitter (not separately shown in FIG. 3). The receiver is configured to implement a receiving function, and the transmitter is configured to implement a sending function.

Optionally, the transceiver 303 may be integrated with the processor 301, or may exist independently, and is coupled to the processor 301 through the input/output port (not shown in FIG. 3) of the VNF instantiation apparatus 300. This is not specifically limited in this embodiment of this application.

It should be noted that the structure of the VNF instantiation apparatus 300 shown in FIG. 3 does not constitute a limitation on the VNF instantiation apparatus. An actual VNF instantiation apparatus may include more or fewer components than those shown in the figure, or combine some components, or have different component arrangements.

Figure 4:
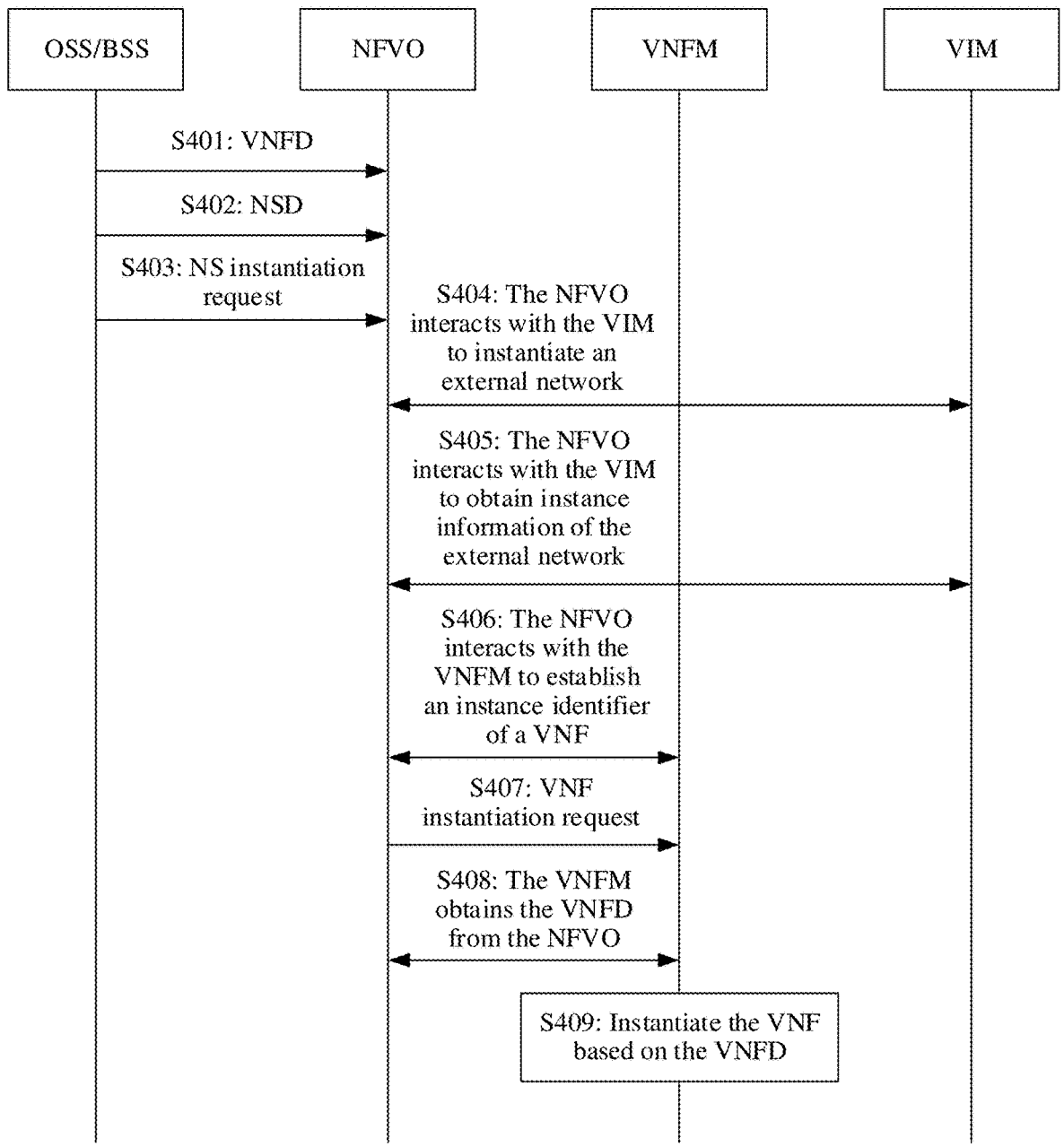
FIG. 4 is a schematic flowchart of a VNF instantiation method according to an embodiment of this application.
Figure 5:
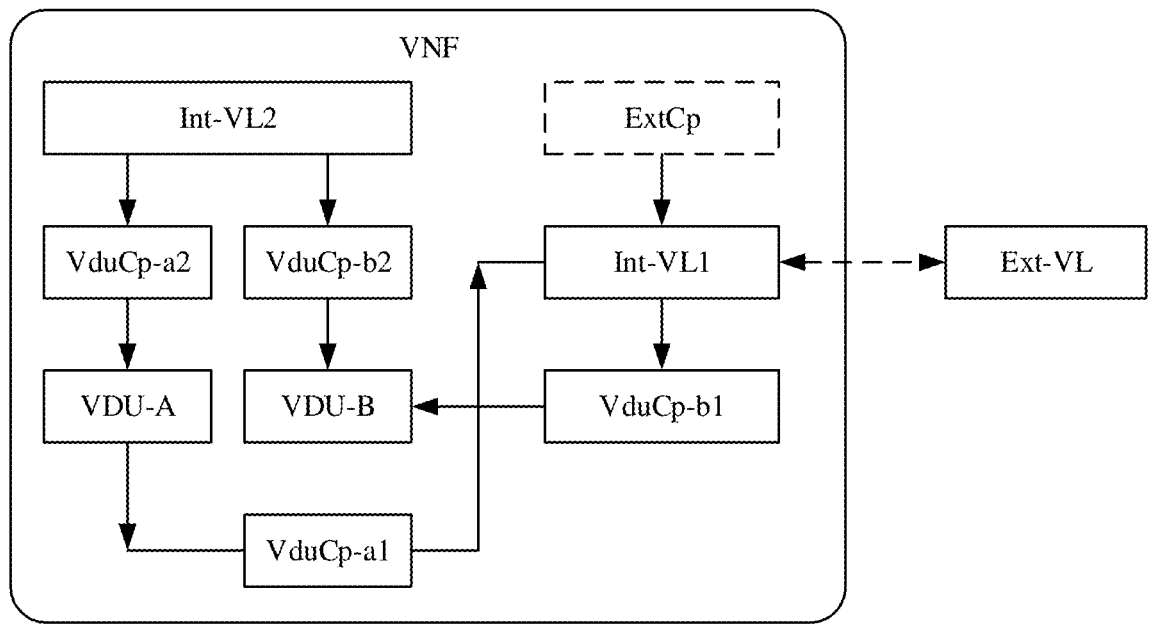
FIG. 5 is a schematic diagram of a structure of a VNF defined in a VNFD model according to an embodiment of this application.

The following describes in detail the VNF instantiation method provided in embodiments of this application with reference to FIG. 4 and FIG. 5.

For example, FIG. 4 is a schematic flowchart of a VNF instantiation method according to an embodiment of this application. The VNF instantiation method is applicable to the NFV system shown in FIG. 2.

As shown in FIG. 4, the VNF instantiation method includes the following steps.

S401: An NFVO receives a VNFD from an OSS/BSS.

The VNFD is for instantiating a VNF. The VNFD includes first indication information and resource requirement information of a first internal network. The first indication information indicates that the resource requirement information of the first internal network is externally visible.

Optionally, the first indication information further indicates that a VNFM does not need to instantiate the first internal network during instantiation of the VNF. In other words, the first internal network may also be instantiated when the NFVO requests a VIM to instantiate an external network based on the resource requirement information of the first internal network. For specific implementation, refer to related descriptions in the following S404 and S409. Details are not described herein again.

For example, FIG. 5 is a schematic diagram of a structure of a VNF according to an embodiment of this application. As shown in FIG. 5, the VNF includes two internal networks Int-VL1 and Int-VL2, two virtual deployment units VDU-A and VDU-B, and four internal connection points VduCp-a1, VduCp-a2, VduCp-b1, and VduCp-b2. The first internal network may be the Int-VL1. The resource requirement information of the first internal network may be resource requirement information of the Int-VL1, such as a connectivity type (connectivity type), a data rate, and quality of service (quality of service, QoS). For details, refer to the following VNFD model 1 and VNFD model 2. Details are not described herein.

In this embodiment of this application, the first internal network is an internal network having a service requirement with an external network. In other words, the first internal network is an internal network that an external network needs to access. For this requirement, the VNF may be defined using the VNFD model 1 or the VNFD model 2, to simplify VNF instantiation operations. For details, refer to the following related content of the VNFD model 1 or the VNFD model 2. Details are not described herein.

In addition to the first internal network, a second internal network may further exist in the VNF. The second internal network is an internal network that has no service requirement with an external network, for example, the internal network Int-VL1 shown in FIG. 5. It should be understood that when there is a service requirement between any second internal network and the external network, the any second internal network may be considered as the first internal network, and may be processed in a processing manner of the first internal network. Similarly, when a service requirement between any first internal network and the external network no longer exists, for example, execution of a service corresponding to the service requirement has been completed, the any first internal network may alternatively be considered as the second internal network, and may be processed in a processing manner of the second internal network. In other words, for an internal network in the VNF, a network type of the internal network may be dynamically adjusted based on whether there is a service requirement between the internal network and the external network. For example, the internal network may be converted between the first internal network and the second internal network.

Optionally, the VNF may further include one external connection point ExtCp (shown by a dashed line box in FIG. 5).

In this embodiment of this application, the VNF shown in FIG. 5 may be defined using the following two TOSCA language-based VNFD models. Details are separately described below.

The following shows the VNFD model 1 defined using the TOSCA language. Text following "#" is a comment.

```
topology_template:
    substitution_mappings:
        node_type: tosca.nodes.nfv.exampleVNF
        requirements:
            referable: [ExtCp, referable] #one part of second indication
information, indicating that the ExtCp defined below is only used to set
the resource requirement information of the Int-VL1 to be externally
visible, and a VNFM does not need to instantiate the ExtCp during
instantiation of the VNF
    node_templates:
        ExtCp:
            type: tosca.nodes.nfv.VnfExtCp
            requirements:
                - exposable: int-VL1 #the other part of the second indication
information, indicating that the resource requirement information of the
Int-VL1 has been set to be externally visible
                - referable: #indicating that the VNFM does not need to
instantiate the ExtCp during instantiation of the VNF
        VduCp-b1:
            type: tosca.nodes.nfv.VduCp
            properties:
                layer_protocols: [ ipv4 ]
            requirements:
                - virtual_binding: VDU-B
                - virtual_link:int-VL1 #used to determine a quantity of VduCps
that need to be connected to the Int-VL1
        VDU-B:
            type: tosca.nodes.nfv.Vdu
            properties:
                vdu_profile:
                    min_number_of_instances: 1
                    max_number_of_instances: 1
        Int-VL1:
            type: tosca.nodes.nfv.VnfVirtualLink
            properties:
                connectivity_type:
                    layer_protocols: [ ipv4 ]
                    flow_pattern: mesh
                description: Internal VL
                vl_profile:
                    max_bitrate_requirements:
                        root: 1000000
                        leaf: 100000
                    min_bitrate_requirements:
                        root: 100000
                        leaf: 10000
                    qos:
                        latency: 100 ms
                        packet_delay_variation: 80 ms
                        packet_loss_ratio: 0.00001
            capabilities:
                - exposable: #first indication information, indicating that the
resource requirement information of the Int-VL1 is externally visible,
and the VNFM does not need to instantiate the Int-VL1 during
instantiation of the VNF
```

The following shows the VNFD model 2 defined using the TOSCA language. Text following "#" is a comment.

```
topology_template:
    substitution_mappings:
        node_type: tosca.nodes.nfv.exampleVNF
        capabilities:
            exposable : [Int-VL1, exposable] #third indication information,
indicating that the resource requirement information of the Int-VL1 has
been set to be externally visible
    node_templates:
        #different from the VNFD model 1: the ExtCp is not defined, in
other words, that the resource requirement information of the Int-VL1 is
externally visible is defined in the Int-VL1
        VduCP-b1:
            type: tosca.nodes.nfv.VduCp
            properties:
                layer_protocols: [ ipv4 ]
            requirements:
                - virtual_binding: VDU-B
                - virtual_link: Int-VL1 #used to determine a quantity of
VduCps that need to be connected to the Int-VL1
        VDU-B:
            type: tosca.nodes.nfv.Vdu
            properties:
                vdu_profile:
                    min_number_of_instances: 1
                    max_number_of_instances: 1
        Int-VL1:
            type: tosca.nodes.nfv.VnfVirtualLink
            properties:
                connectivity_type:
                    layer_protocols: [ ipv4 ]
                    flow_pattern: mesh
                description: Internal VL
                vl_profile:
                    max_bitrate_requirements:
                        root: 1000000
                        leaf: 100000
                    min_bitrate_requirements:
                        root: 100000
                        leaf: 10000
                    qos:
                        latency: 100 ms
                        packet_delay_variation: 80 ms
                        packet_loss_ratio: 0.00001
            capabilities:
                - exposable: #first indication information, indicating
that the resource requirement information of the Int-VL1 is externally
visible, and the VNFM does not need to instantiate the Int-VL1 during
instantiation of the VNF
```

Optionally, the first indication information further indicates that the VNFM does not need to instantiate the first internal network during instantiation of the VNF. In other words, the first internal network may also be instantiated when the NFVO requests the VIM to instantiate the external network based on the resource requirement information of the first internal network.

Optionally, the first indication information may be defined in a capabilities field of the first internal network in the VNFD. With reference to FIG. 5 and the foregoing two VNFD models, the first indication information may be "exposable" in the capabilities (capabilities) field of the internal network Int-VL1.

In a possible design solution, that the resource requirement information of the first internal network is externally visible may include: The external network obtains the resource requirement information of the first internal network based on information about an external connection point in the VNFD. In other words, the resource requirement information of the first internal network may be provided by the external connection point in the VNFD for the external network.

Optionally, that the external network obtains the resource requirement information of the first internal network based on information about an external connection point in the VNFD may include: The VNFD further includes second indication information, where the second indication information indicates that the external connection point in the VNF is a virtual node, and the external connection point is used to set the resource requirement information of the first internal network to be externally visible. In this way, the virtual node may be understood as that there is no need to instantiate the external connection point in the VNF. The external connection point is only used to provide the resource requirement information of the first internal network for the external network, and is not used to establish a communication connection between the internal network and the external network.

Optionally, the second indication information may be defined in a capabilities field in substitution_mappings and a requirements field of the external connection point in the VNFD.

With reference to FIG. 5 and the foregoing VNFD model 1, the second indication information may include "referable: [ExtCp, referable]" in a requirements (requirements) field in substitution_mappings (substitution_mappings), and "–exposable:Int-VL1" in the requirements (requirements) field of the external connection point ExtCp.

In another possible design solution, that the resource requirement information of the first internal network is externally visible may include: The external network obtains the resource requirement information of the first internal network based on internal network information in the VNFD. In other words, the resource requirement information of the first internal network may be provided by the first internal network for the external network. In other words, alternatively, the external connection point may not be defined in a VNFD model, but the resource requirement information of the first internal network is directly set to be externally visible, to further simplify a VNF instantiation operation procedure. This improves the VNF instantiation efficiency.

Optionally, that the external network obtains the resource requirement information of the first internal network based on internal network information in the VNFD may include: The VNFD may further include third indication information, where the third indication information indicates that the resource requirement information of the first internal network is externally visible.

Optionally, the third indication information may be defined in the capabilities field in substitution_mappings in the VNFD. With reference to FIG. 5 and the foregoing VNFD model 2, the third indication information may be "exposable:[Int-VL1, exposable]" in the capabilities (capabilities) field in substitution_mappings.

In a possible design solution, the VNFD may further include information about a virtual deployment unit connection point VDUCP connected to the internal network in the VNF, for example, the VdpCp-b1 connected to the internal network Int-VL1 in FIG. 5 and the foregoing two VNFD models. It should be understood that, in FIG. 5 and the foregoing two VNFD models, only one VDUCP is connected to an internal network, namely, the VdpCp-b1. In actual application, alternatively, a plurality of VDUCPs may be connected to an internal network. This is not specifically limited in this embodiment of this application.

Optionally, the VNFM applies to the VIM for instantiating a first port in the external network. The first port is used by the external network to communicate with the internal network via the VDUCP, and a quantity of first ports is the same as a quantity of VDUCPs connected to the internal network. This can avoid a mismatch problem caused by inconsistency between a port quantity of the external network and a port quantity of the internal network.

It should be noted that definitions of the foregoing two VNFD models provide only definitions of the first internal network Int-VL1 and network nodes that are connected to the Int-VL1 in the VNF shown in FIG. 5, such as the VDU-B, the VduCp-b1, and the ExtCp. For definitions of other network nodes in the VNF shown in FIG. 5, refer to an existing implementation. Details are not described again in this embodiment of this application.

In addition, the foregoing two VNFD models are examples defined using the TOSCA language. In actual application, a VNFD model may alternatively be defined in another language and/or in another manner. This is not specifically limited in this embodiment of this application.

In a possible design solution, that an NFVO receives a VNFD from an OSS/BSS in S401 may include: The NFVO receives a VNF package (VNF package) file from the OSS/BSS. The VNF package file is for obtaining the VNFD.

It should be noted that a same VNFD may correspond to one or more VNF package files, and the one or more VNF package files may be carried by one or more messages. The NFVO may parse the one or more messages received from the OSS/BSS, to obtain the one or more VNF package files carried by the one or more messages.

Further, the NFVO may further send one or more response messages for the one or more messages to the OSS/BSS, to notify the OSS/BSS of whether the VNF package file is successfully received. If receiving fails, the response message may be used to request the OSS/BSS to resend a VNF package file that fails to be received last time, to improve reliability of VNF package file transmission.

Alternatively, optionally, the NFVO may read a VNF package file from a local cache of the NFVO. For example, the NFVO may store, in the local cache for backup, the one or more VNF package files obtained by parsing the one or more messages, to reduce signaling interaction between the NFVO and the OSS/BSS. This improves the VNF instantiation efficiency.

S402: The NFVO receives an NSD from the OSS/BSS.

In a possible design solution, the NSD includes an identifier of the VNFD and fourth indication information. The identifier of the VNFD indicates a VNFD model corresponding to the VNF, for example, an identifier of the VNFD model 1 or an identifier of the VNFD model 2 in S401. The fourth indication information indicates that external connection information of the VNF is the resource requirement information of the first internal network, and there is no need to define a resource requirement of the external network in the NSD. In other words, the resource requirement of the external network may be determined based on the resource requirement information of the first internal network, to instantiate the external network. This reduces a data volume of an NSD that needs to be transmitted. This further improves the VNF instantiation efficiency.

Optionally, the fourth indication information may be defined in a requirements field of the VNF and a capabilities field of the external network in the NSD.

Alternatively, optionally, the fourth indication information may be defined in a capabilities field of the VNF and a requirements field of the external network in the NSD. This is not specifically limited in this embodiment of this application.

In this embodiment of this application, corresponding NSD models may be respectively defined for the foregoing two VNFD models. Details are separately described below.

The following shows an NSD model 1 corresponding to the VNFD model 1. A VNF1 in the NSD model 1 may be considered as the foregoing VNF. Text following "#" is a comment.

```
topology_template:
  node_templates:
    VNF1:
      type: tosca.nodes.nfv.example_VNF1
      properties:
        flavour_id: simple
        vnf_profile:
          instantiation_level: level_1
          min_number_of_instances: 2
          max_number_of_instances: 6
      requirements:
        - referable: Ext-VL #the fourth indication information,
indicating that resource requirement information of the Ext-VL
comes from the resource requirement information of the first internal
network, and in this case, the requirement information of the Ext-VL
does not need to be defined in the NSD
    Ext-VL:
      type: tosca.nodes.nfv.NsVirtualLink
      capabilities:
        - referable: #the fourth indication information, indicating
that the resource requirement information of the Ext-VL comes from
the resource requirement information of the first internal network,
and in this case, the requirement information of the Ext-VL
does not need to be defined in the NSD
```

It can be learned with reference to the NSD model 1 that the fourth indication information may be "–referable: Ext-VL" in a requirements (requirements) field in the VNF1 in the NSD model 1, and "–referable:" in a capabilities (capabilities) field of the Ext-VL in the NSD model 1.

The following shows an NSD model 2 corresponding to the VNFD model 2. A VNF1 in the NSD model 2 may be considered as the foregoing VNF. Text following "#" is a comment.

```
topology_template:
  node_templates:
    VNF1:
      type: tosca.nodes.nfv.example_VNF1
      properties:
        flavour_id: simple
        vnf_profile:
          instantiation_level: level_1
          min_number_of_instances: 2
          max_number_of_instances: 6
      capabilities :
        exposable: #the fourth indication information, indicating
that resource requirement information of an Ext-VL comes from the
resource requirement information of the first internal network, and in this
case, the requirement information of the Ext-VL does not need to be
defined in the NSD
    Ext-VL :
      type: tosca.nodes.nfv.NsVirtualLink
      requirements:
        - exposable: VNF1 #the fourth indication information,
indicating that the resource requirement information of the Ext-VL comes
from the resource requirement information of the first internal network,
and in this case, the requirement information of the Ext-VL does not need
to be defined in the NSD
```

It can be learned with reference to the NSD model 2 that the fourth indication information may be "exposable:" in a capabilities (capabilities) field in the VNF1 in the NSD model 2, and "–exposable:VNF1" in a requirements (requirements) capability field of the Ext-VL in the NSD model 2.

It should be noted that both the foregoing two NSD models are examples defined using the TOSCA language. In actual application, a VNFD model may alternatively be defined in another language and/or in another manner. This is not specifically limited in this embodiment of this application.

In another possible design solution, if a VNF is not defined based on the VNFD model 1 or the VNFD model 2 described in S401, it indicates that external connection information of the VNF is separately defined. In this case, resource requirement information of an external network Ext-VL connected to the VNF needs to be defined in an NSD model. For details, refer to an existing implementation. Details are not described again in this embodiment of this application.

S403: The NFVO receives an NS instantiation request from the OSS/BSS. For specific implementation, refer to the conventional technology. Details are not described again in this embodiment of this application.

S404: The NFVO interacts with the VIM to instantiate the external network.

Specifically, the NFVO sends an external network instantiation request to the VIM, and receives an external network instantiation response from the VIM.

The external network instantiation request is used by the VIM to instantiate, based on the resource requirement information of the first internal network, the external network connected to the VNF. The external network instantiation request may carry the resource requirement information of the first internal network in a VNFD model, for example, the VNFD model 1 or the VNFD model 2. The VIM may instantiate the external network Ext-VL based on the resource requirement information of the first internal network.

Specifically, if the NFVO determines that a connection relationship between the VNF and the external network in the NSD model is "referable" or "exposable", the NFVO may query the VNFD model for the resource requirement information of the first internal network of the VNF connected to the external network, and request, by using the resource requirement information of the first internal network, the VIM to instantiate the external network. The resource requirement information of the first internal network of the VNF may be obtained by querying the NSD model and a corresponding VNFD model. The following uses the foregoing two NSD models and two VNFD models as examples for detailed description.

According to the NSD model 1 and the VNFD model 1, the NFVO may learn, based on content "–referable:Ext-VL" of the requirements field in the VNF1 and content "–referable:" of the capabilities field in the Ext-VL in the NSD model 1, that a connection relationship between the VNF1 and the Ext-VL is "referable". In this case, the NFVO queries the VNFD model 1 based on the connection relationship "referable". This specifically includes: finding an external connection point ExtCp whose requirements field content includes "referable", and then finding, based on content "–exposable:Int-VL1" of another requirements field of the ExtCp, connection information of the internal network Int-VL1 connected to the external connection point, that is, the resource requirement information of the first internal network.

According to the NSD model 2 and the VNFD model 2, the NFVO may learn, based on content "exposable" of the capabilities field in the VNF1 and content "–exposable: VNF1" of the requirements field in the Ext-VL in the NSD model 2, that a connection relationship between the VNF1 and the Ext-VL is "exposable". In this case, the NFVO queries the VNFD model 2 based on the connection relationship "exposable". This specifically includes: based on content "exposable:[Int-VL1, exposable]" of the substitution_mappings field, learning of connection information of the internal network Int-VL1 connected to the external network Ext-VL, that is, the resource requirement information of the first internal network.

If the VIM successfully instantiates the external network, the external network instantiation response includes instantiation success information of the external network, and the NFVO may perform the following S405. It should be understood that if the VIM fails to instantiate the external network, the external network instantiation response includes instantiation failure information of the external network.

It should be noted that the external network is instantiated based on the resource requirement information of the first internal network. In a possible design solution, the VIM may further instantiate the first internal network based on the resource requirement information of the first internal network. For example, as shown in FIG. 5, when instantiating the external network Ext-VL, the VIM may also instantiate the first internal network Int-VL1. In this way, the VNFM does not need to instantiate the first internal network Int-VL1 during instantiation of the VNF in S409. In other words, the first internal network may be instantiated together by the VIM when the external network Ext-VL is instantiated, or may be instantiated by the VNFM when the VNF is instantiated. This is not specifically limited in this embodiment of this application.

S405: The NFVO interacts with the VIM to obtain instance information of the external network.

Specifically, the NFVO sends a request for obtaining the instance information of the external network to the VIM, and receives a response for obtaining the instance information of the external network from the VIM. The request for obtaining the instance information of the external network includes an identifier of an instance of the external network. The response for obtaining the instance information of the external network includes the instance information of the external network, such as an identifier of the external network, a network type, bandwidth, an internet protocol (internet protocol, IP) address pool, and a name.

S406: The NFVO interacts with the VNFM to establish an instance identifier of the VNF.

Specifically, the NFVO sends a VNF instance identifier request to the VNFM, and receives a VNF instance identifier response from the VNFM.

The VNF instance identifier request includes the identifier of the VNFD. The VNF instance identifier response includes instance identifier establishment success information of the VNF.

Specifically, the VNFM may establish a binding relationship between the instance identifier of the VNF and the VNFD. The binding relationship indicates that the VNF corresponding to the instance identifier of the VNF is instantiated based on the VNFD.

S407: The NFVO sends a VNF instantiation request to the VNFM.

The VNF instantiation request includes the instance information of the external network that is received in S405 and the instance identifier of the VNF.

S408: The VNFM obtains the VNFD from the NFVO.

Specifically, the VNFM sends a VNFD obtaining request to the NFVO, and receives a VNFD obtaining response from the NFVO. The VNFD obtaining request includes the instance identifier of the VNF. The VNFD obtaining response includes the VNFD. The VNFD may be obtained by the VNFM by querying a binding relationship between the VNF and the VNFD based on the instance identifier of the VNF.

S409: The VNFM instantiates the VNF based on the VNFD.

Specifically, when instantiating the VNF based on the VNFD, the VNFM needs to instantiate each network node, for example, the VDU-A, the VDU-B, the VduCp-b1, and the Int-VL1, and establishes a connection between the VNF and the external network based on the instance information of the external network, to establish a communication connection between the external network Ext-VL and the first internal network Int-VL1.

It should be noted that, in the foregoing two VNFD models and the VNF shown in FIG. 5, there is only one virtual deployment node connected to the external network Ext-VL, that is, the VduCp-b1. In actual application, there may also be a plurality of virtual deployment nodes connected to the external network Ext-VL. This is not specifically limited in this embodiment of this application.

In addition, because the external network is also instantiated based on the resource requirement information of the first internal network, the first internal network may also be instantiated together when the VIM instantiates the external network. For a specific implementation, refer to S404. Details are not described herein again.

Based on the VNF instantiation method provided in this embodiment of this application, the NFVO can obtain the first indication information in the VNFD. The first indication information indicates that the resource requirement information of the first internal network in the VNFD is externally visible. In other words, the external network may be instantiated based on the resource requirement information of the first internal network. In this way, the NFVO may request, based on the resource requirement information of the first internal network, the VIM to instantiate the external network, and request, based on the VNFD, the VNFM to instantiate the VNF, to establish direct communication between the VNF and the external network. This can resolve a problem that a communication connection between an internal network and an external network cannot be established because the NFVO cannot be connected to both the internal network and the external network at the same time via a same external connection point in the VNF, and there is no need to instantiate the external connection point and an entity corresponding to the internal network in the VNF. This can improve VNF instantiation efficiency.

The VNF instantiation method provided in embodiments of this application is described in detail above with reference to FIG. 4 and FIG. 5. Another VNF instantiation apparatus provided in embodiments of this application is described below in detail with reference to FIG. 6.

Figure 6:
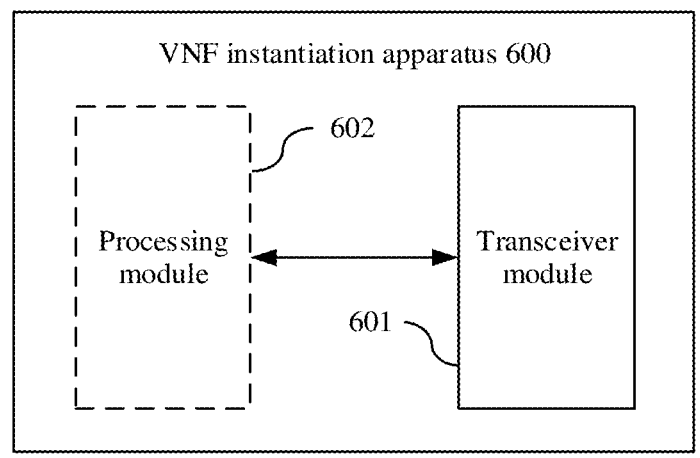
FIG. 6 is a schematic diagram 2 of a structure of a VNF instantiation apparatus according to an embodiment of this application.

For example, FIG. 6 is a schematic diagram 2 of a structure of a VNF instantiation apparatus according to an embodiment of this application. As shown in FIG. 6, a VNF instantiation apparatus 600 includes a transceiver module 601. For ease of description, FIG. 6 shows only main components of the VNF instantiation apparatus.

In some embodiments, the VNF instantiation apparatus 600 is applicable to the NFV system shown in FIG. 2, and performs functions of the NFVO in the VNF instantiation method shown in FIG. 4.

The transceiver module 601 is configured to receive virtualised network function description information VNFD from an operations support system/business support system OSS/BSS. The VNFD is for instantiating a virtualised network function VNF. The VNFD includes first indication information and resource requirement information of a first internal network. The first indication information indicates that the resource requirement information of the first internal network is externally visible.

The transceiver module 601 is further configured to send an external network instantiation request to a virtualized infrastructure manager VIM. The external network instantiation request is used by the VIM to instantiate, based on the resource requirement information of the first internal network, an external network connected to the VNF.

The transceiver module 601 is further configured to send a VNF instantiation request to a virtualized network function manager VNFM, where the VNF instantiation request is used by the VNFM to instantiate the VNF based on the VNFD.

Optionally, the first indication information further indicates that the VNFM does not need to instantiate the first internal network during instantiation of the VNF. In other words, the first internal network may also be instantiated when the NFVO requests the VIM to instantiate the external network based on the resource requirement information of the first internal network.

Optionally, the first indication information may be defined in a capabilities field of an internal network in the VNFD.

In a possible design solution, that the resource requirement information of the first internal network is externally visible may include: The external network obtains the resource requirement information of the first internal network based on information about an external connection point in the VNFD. In other words, the resource requirement information of the first internal network may be provided by the external connection point in the VNFD for the external network.

Optionally, that the external network obtains the resource requirement information of the first internal network based on information about an external connection point in the VNFD may include: The VNFD may further include second indication information, where the second indication information indicates that the external connection point in the VNF is a virtual node, and the external connection point is used to set the resource requirement information of the first internal network to be externally visible.

The virtual node may be understood as that there is no need to instantiate the external connection point in the VNF. The external connection point is only used to provide the resource requirement information of the first internal network for the external network, and is not used to establish a communication connection between the internal network and the external network.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD. In other words, the resource requirement information of the first internal network may be provided by the first internal network for the external network.

Optionally, that the external network obtains the resource requirement information of the first internal network based on internal network information in the VNFD may include: The VNFD may further include third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of first ports is the same as a quantity of VDUCPs connected to the internal network.

In a possible design solution, the transceiver module 601 is further configured to receive a VNF package file from the OSS/BSS. The VNF package file is for obtaining the VNFD.

It should be noted that a same VNFD may correspond to one or more VNF package files, and the one or more VNF package files may be carried by one or more messages. The NFVO may parse the one or more messages received from the OSS/BSS, to obtain the one or more VNF package files carried by the one or more messages.

Further, the transceiver module 601 is further configured to send one or more response messages for the one or more messages to the OSS/BSS, to notify the OSS/BSS of whether the VNF package file is successfully received. If receiving fails, the response message may be used to request the OSS/BSS to resend a VNF package file that fails to be received last time, to improve reliability of VNF package file transmission.

Alternatively, optionally, the VNF instantiation apparatus 600 may read a VNF package file from a local cache of the VNF instantiation apparatus 600. This is not specifically limited in this embodiment of this application.

In a possible design solution, the transceiver module 601 is further configured to receive network service description information NSD from the OSS/BSS. The NSD includes an identifier of the VNFD and fourth indication information. The fourth indication information indicates that external connection information of the VNF is the resource requirement information of the first internal network, and there is no need to define a resource requirement of the external network in the NSD.

Optionally, the fourth indication information may be defined in a requirements field of the VNF and a capabilities field of the external network in the NSD.

Alternatively, optionally, the fourth indication information may be defined in a capabilities field of the VNF and a requirements field of the external network in the NSD. This is not specifically limited in this embodiment of this application.

Optionally, the VNF instantiation apparatus 600 may further include a processing module 602 and a storage module (not shown in FIG. 6). The storage module stores a program or instructions. When the processing module 602 executes the program or the instructions, the VNF instantiation apparatus 600 is enabled to perform the VNF instantiation method in the foregoing method embodiments.

It should be noted that the VNF instantiation apparatus 600 may be an NFVO or the VNF instantiation apparatus 300, or a chip (system) or another part or component that can be disposed in the NFVO or the foregoing VNF instantiation apparatus 300. This is not limited in this application.

In addition, for a technical effect of the VNF instantiation apparatus 600, refer to the technical effect of the VNF instantiation method described in the foregoing method embodiments. Details are not described herein again.

In some other embodiments, the VNF instantiation apparatus 600 is applicable to the NFV system shown in FIG. 2, and performs functions of the OSS/BSS in the VNF instantiation method shown in FIG. 4.

The transceiver module 601 is configured to send virtualised network function description information VNFD to a network functions virtualisation orchestrator NFVO. The VNFD is for instantiating a virtualised network function VNF. The VNFD includes first indication information and resource requirement information of a first internal network. The first indication information indicates that the resource requirement information of the first internal network is externally visible.

The transceiver module 601 is further configured to send network service description information NSD to the NFVO. The NSD includes an identifier of the VNFD and fourth indication information. The fourth indication information indicates that external connection information of the VNF is the resource requirement information of the first internal network, and there is no need to define a resource requirement of an external network in the NSD.

Optionally, the first indication information further indicates that the VNFM does not need to instantiate the first internal network during instantiation of the VNF. In other words, the first internal network may also be instantiated when the NFVO requests the VIM to instantiate the external network based on the resource requirement information of the first internal network.

Optionally, the first indication information may be defined in a capabilities field of an internal network in the VNFD.

In a possible design solution, that the resource requirement information of the first internal network is externally visible may include: The external network obtains the resource requirement information of the first internal network based on information about an external connection point in the VNFD.

Optionally, that the external network obtains the resource requirement information of the first internal network based on information about an external connection point in the VNFD may include: The VNFD further includes second indication information, where the second indication information indicates that the external connection point in the VNF is a virtual node, and the external connection point is used to set the resource requirement information of the first internal network to be externally visible.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD.

Optionally, that the external network obtains the resource requirement information of the first internal network based on internal network information in the VNFD may include: The VNFD may further include third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of the first ports is the same as a quantity of VDUCPs connected to the internal network.

Optionally, the fourth indication information may be defined in a requirements field of the VNF and a capabilities field of the external network in the NSD.

Alternatively, optionally, the fourth indication information may be defined in a capabilities field of the VNF and a requirements field of the external network in the NSD. This is not specifically limited in this embodiment of this application.

In a possible design solution, the transceiver module 601 is further configured to send a VNF package file to the NFVO. The VNF package file is for obtaining the VNFD.

It should be noted that a same VNFD may correspond to one or more VNF package files, and the one or more VNF package files may be carried by one or more messages.

Further, the transceiver module 601 is further configured to receive one or more response messages for the one or more messages from the NFVO, to learn of whether the NFVO successfully receives the VNF package file. If receiving fails, the transceiver module 601 is further configured to resend a VNF package file that fails to be received last time to the NFVO, to improve reliability of VNF package file transmission.

Optionally, the VNF instantiation apparatus 600 may further include a processing module 602 and a storage module (not shown in FIG. 6). The storage module stores a program or instructions. When the processing module 602 executes the program or the instructions, the VNF instantiation apparatus 600 is enabled to perform the VNF instantiation method in the foregoing method embodiments.

It should be noted that the VNF instantiation apparatus 600 may be a BSS/OSS or the foregoing VNF instantiation apparatus 300, or a chip (system) or another part or component that can be disposed in the BSS/OSS or the foregoing VNF instantiation apparatus 300. This is not limited in this application.

In addition, for a technical effect of the VNF instantiation apparatus 600, refer to the technical effect of the VNF instantiation method described in the foregoing method embodiments. Details are not described herein again.

In some still other embodiments, the VNF instantiation apparatus 600 is applicable to the NFV system shown in FIG. 2, and performs functions of the VIM in the VNF instantiation method shown in FIG. 4.

The transceiver module 601 is configured to receive an external network instantiation request from a network functions virtualisation orchestrator NFVO. The external network instantiation request includes resource requirement information of a first internal network. The resource requirement information of the first internal network is used by the VIM to instantiate an external network connected to a virtualised network function VNF.

The transceiver module 601 is further configured to send instance information of the external network to the NFVO.

The instance information of the external network is determined based on the resource requirement information of the first internal network.

In a possible design solution, the transceiver module 601 is further configured to receive a port instantiation request from a virtualized network function manager VNFM. The port instantiation request is used by the VIM to instantiate a first port in the external network. The first port is used by the external network to communicate with an internal network by using a VDUCP.

Optionally, the VNF instantiation apparatus 600 may further include a processing module 602 and a storage module (not shown in FIG. 6). The storage module stores a program or instructions. When the processing module 602 executes the program or the instructions, the VNF instantiation apparatus 600 is enabled to perform the VNF instantiation method in the foregoing method embodiments.

It should be noted that the VNF instantiation apparatus 600 may be a VIM or the foregoing VNF instantiation apparatus 300, or a chip (system) or another part or component that can be disposed in the VIM or the foregoing VNF instantiation apparatus 300. This is not limited in this application.

In addition, for a technical effect of the VNF instantiation apparatus 600, refer to the technical effect of the VNF instantiation method described in the foregoing method embodiments. Details are not described herein again.

In some still other embodiments, the VNF instantiation apparatus 600 is applicable to the NFV system shown in FIG. 2, and performs functions of the VNFM in the VNF instantiation method shown in FIG. 4.

The transceiver module 601 is configured to receive a virtualised network function VNF instantiation request from a network functions virtualisation orchestrator NFVO. The VNF instantiation request includes virtualised network function description information VNFD. The VNFD is used by a VNFM to instantiate a VNF. The VNFD includes first indication information and resource requirement information of a first internal network. The first indication information indicates that the resource requirement information of the first internal network is externally visible.

Optionally, the first indication information further indicates that the VNFM does not need to instantiate the first internal network during instantiation of the VNF. In other words, the first internal network may also be instantiated when the NFVO requests the VIM to instantiate the external network based on the resource requirement information of the first internal network.

Optionally, the first indication information may be defined in a capabilities field of an internal network in the VNFD.

In a possible design solution, that the resource requirement information of the first internal network is externally visible may include: The external network obtains the resource requirement information of the first internal network based on information about an external connection point in the VNFD. In other words, the resource requirement information of the first internal network may be provided by the external connection point in the VNFD for the external network.

Optionally, that the external network obtains the resource requirement information of the first internal network based on information about an external connection point in the VNFD may include: The VNFD may further include second indication information, where the second indication information indicates that the external connection point in the VNF is a virtual node, and the external connection point is used to set the resource requirement information of the first internal network to be externally visible.

The virtual node may be understood as that there is no need to instantiate the external connection point in the VNF. The external connection point is only used to provide the resource requirement information of the first internal network for the external network, and is not used to establish a communication connection between the internal network and the external network.

Optionally, the second indication information may be defined in a capabilities field in substitution_mappings and a requirements field of the external connection point in the VNFD.

In another possible design solution, that the resource requirement information of the first internal network is externally visible may include: The external network obtains the resource requirement information of the first internal network based on internal network information in the VNFD. In other words, the resource requirement information of the first internal network may be provided by the first internal network for the external network.

Optionally, that the external network obtains the resource requirement information of the first internal network based on internal network information in the VNFD may include: The VNFD further includes third indication information, where the third indication information indicates that the resource requirement information of the first internal network is externally visible.

Optionally, the third indication information may be defined in the capabilities field in substitution_mappings in the VNFD.

In a possible design solution, the VNFD may further include information about a virtual deployment unit connection point VDUCP connected to the internal network in the VNF. A plurality of VDUCPs may be connected to the internal network. The VNFM applies to the VIM for instantiating a first port in the external network. The first port is used by the external network to communicate with the internal network via the VDUCP, and a quantity of first ports is the same as a quantity of VDUCPs connected to the internal network.

Optionally, the VNF instantiation apparatus 600 may further include a processing module 602 and a storage module (not shown in FIG. 6). The storage module stores a program or instructions. When the processing module 602 executes the program or the instructions, the VNF instantiation apparatus 600 is enabled to perform the VNF instantiation method in the foregoing method embodiments.

It should be noted that the VNF instantiation apparatus 600 may be a VNFM or the foregoing VNF instantiation apparatus 300, or a chip (system) or another part or component that can be disposed in the VNFM or the foregoing VNF instantiation apparatus 300. This is not limited in this application.

In addition, for a technical effect of the VNF instantiation apparatus 600, refer to the technical effect of the VNF instantiation method described in the foregoing method embodiments. Details are not described herein again.

An embodiment of this application provides a chip system. The chip system includes a processor and an input/output port. The processor is configured to implement a processing function in the foregoing method embodiments, and the input/output port is configured to implement a transceiver function in the foregoing method embodiments.

In a possible design, the chip system further includes a memory. The memory is configured to store program instructions and data for implementing the functions in the foregoing method embodiments.

The chip system may include a chip, or may include a chip and another discrete component.

An embodiment of this application provides an NFV system. The NFV system includes an NFVO, a BSS/OSS, a VIM, a VNFM, an NFVI, one or more VNFs, and one or more EMs.

An embodiment of this application provides a computer-readable storage medium, including a computer program or instructions. When the computer program or the instructions is/are run on a computer, the computer is enabled to perform the VNF instantiation method in the foregoing method embodiments.

An embodiment of this application provides a computer program product, including a computer program or instructions. When the computer program or the instructions is/are run on a computer, the computer is enabled to perform the VNF instantiation method in the foregoing method embodiments.

It should be understood that, the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through an example rather than a limitative description, random access memories (random access memory, RAM) in many forms may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: only A exists, both A and B exist, and only B exists. A and B may be singular or plural. In addition, the character "/" in this specification usually indicates an "or" relationship between the associated objects, or may indicate an "and/or" relationship. A specific meaning depends on a context.

In this application, at least one means one or more, and a plurality of means two or more. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A virtualized network function (VNF) instantiation method, comprising:
    receiving, by a network functions virtualization orchestrator (NFVO), virtualized network function description information (VNFD) from an operations support system/business support system (OSS/BSS), wherein the VNFD is for instantiating a VNF, the VNFD comprises first indication information and resource requirement information of a first internal network, and the first indication information indicates that the resource requirement information of the first internal network is externally visible;
    sending, by the NFVO to a virtualized infrastructure manager (VIM), an external network instantiation request to be used by the VIM to instantiate, based on the resource requirement information of the first internal network, an external network connected to the VNF; and
    sending, by the NFVO to a virtualized network function manager (VNFM), a VNF instantiation request to be used by the VNFM to instantiate the VNF based on the VNFD.

2. The VNF instantiation method according to claim 1, wherein the first indication information further indicates that the VNFM does not need to instantiate the first internal network during instantiation of the VNF.

3. The VNF instantiation method according to claim 1, wherein the first indication information is defined in a capabilities field of the first internal network in the VNFD.

4. The VNF instantiation method according to claim 1, wherein the resource requirement information of the first internal network is externally visible and is obtainable by the external network based on information about an external connection point in the VNFD.

5. The VNF instantiation method according to claim 1, wherein the resource requirement information of the first internal network is externally visible and is obtainable by the external network based on internal network information in the VNFD.

6. A virtualized network function (VNF) instantiation apparatus, comprising a transceiver, wherein the transceiver is configured to receive virtualized network function description information (VNFD) from an operations support system/business support system (OSS/BSS), wherein the VNFD is for instantiating a VNF, the VNFD comprises first indication information and resource requirement information of a first internal network, and the first indication information indicates that the resource requirement information of the first internal network is externally visible;
    the transceiver is further configured to send to a virtualized infrastructure manager (VIM) an external network instantiation request to be used by the VIM to instantiate, based on the resource requirement information of the first internal network, an external network connected to the VNF; and
    the transceiver is further configured to send to a virtualized network function manager (VNFM) a VNF instantiation request to be used by the VNFM to instantiate the VNF based on the VNFD.

7. The VNF instantiation apparatus according to claim 6, wherein the first indication information further indicates that the VNFM does not need to instantiate the first internal network during instantiation of the VNF.

8. The VNF instantiation apparatus according to claim 6, wherein the first indication information is defined in a capabilities field of the first internal network in the VNFD.

9. The VNF instantiation apparatus according to claim 6, wherein the resource requirement information of the first internal network is externally visible and is obtainable by the external network based on information about an external connection point in the VNFD.

10. The VNF instantiation apparatus according to claim 6, wherein the resource requirement information of the first internal network is externally visible and is
    obtainable by the external network based on internal network information in the VNFD.

11. A virtualized network function (VNF) instantiation method, comprising:
    sending, by an operations support system/business support system (OSS/BSS), virtualized network function description information (VNFD) to a network functions virtualization orchestrator (NFVO);
    receiving, by the NFVO, the VNFD from the OSS/BSS, wherein the VNFD is for instantiating a VNF, the VNFD comprises first indication information and resource requirement information of a first internal network, and the first indication information indicates that the resource requirement information of the first internal network is externally visible;

sending, by the NFVO, an external network instantiation request to a virtualized infrastructure manager (VIM);

receiving, by the VIM, the external network instantiation request;

instantiating, by the VIM using the external network instantiation request and based on the resource requirement information of the first internal network, an external network connected to the VNF;

sending, by the NFVO, a VNF instantiation request to a virtualized network function manager (VNFM);

receiving, by the VNFM, the VNF instantiation request; and instantiating, by the VNFM using the VNF instantiation request and based on the VNFD, the VNF.

12. The VNF instantiation method according to claim 11, wherein the first indication information further indicates that the VNFM does not need to instantiate the first internal network during instantiation of the VNF.

13. The VNF instantiation method according to claim 11, wherein the first indication information is defined in a capabilities field of the first internal network in the VNFD.

14. The VNF instantiation method according to claim 11, wherein that the resource requirement information of the first internal network is externally visible comprises:

obtaining, by the external network, the resource requirement information of the first internal network based on information about an external connection point in the VNFD.

15. The VNF instantiation method according to claim 11, wherein that the resource requirement information of the first internal network is externally visible comprises:

obtaining, by the external network, the resource requirement information of the first internal network based on internal network information in the VNFD.

16. A communications system, comprising an operations support system/business support system (OSS/BSS), a network functions virtualization orchestrator (NFVO), a virtualized infrastructure manager (VIM), and a virtualized network function manager (VNFM);

wherein the OSS/BSS is configured to:
send virtualized network function description information (VNFD) to the NFVO;

wherein the NFVO is configured to:
receive the VNFD from the OSS/BSS, wherein the VNFD is for instantiating a virtualized network function (VNF), the VNFD comprises first indication information and resource requirement information of a first internal network, and the first indication information indicates that the resource requirement information of the first internal network is externally visible;
send an external network instantiation request to the VIM; and
send a VNF instantiation request to the VNFM;

wherein the VIM is configured to:
receive the external network instantiation request; and
instantiate, using the external network instantiation request and based on the resource requirement information of the first internal network, an external network connected to the VNF; and wherein the VNFM is configured to:
receive the VNF instantiation request; and
instantiate, using the VNF instantiation request and based on the VNFD, the VNF.

17. The communications system according to claim 16, wherein the first indication information further indicates that the VNFM does not need to instantiate the first internal network during instantiation of the VNF.

18. The communications system according to claim 16, wherein the first indication information is defined in a capabilities field of the first internal network in the VNFD.

19. The communications system according to claim 16, wherein the external network is configured to obtain the resource requirement information of the first internal network based on information about an external connection point in the VNFD.

20. The communications system according to claim 16, wherein the external network is configured to obtain the resource requirement information of the first internal network based on internal network information in the VNFD.

* * * * *